US012609549B2

(12) United States Patent
Harrigan et al.

(10) Patent No.: US 12,609,549 B2
(45) Date of Patent: Apr. 21, 2026

(54) ADAPTIVE BATTERY MANAGEMENT

(71) Applicant: Microsoft Technology Licensing, LLC, Redmond, WA (US)

(72) Inventors: Jason Harrigan, Sultan, WA (US); Tero J. Patana, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 792 days.

(21) Appl. No.: 17/955,255

(22) Filed: Sep. 28, 2022

(65) Prior Publication Data

US 2024/0106256 A1 Mar. 28, 2024

(51) Int. Cl.
*H02J 7/00* (2006.01)
*A63F 13/235* (2014.01)
*A63F 13/285* (2014.01)

(52) U.S. Cl.
CPC ........ *H02J 7/00712* (2020.01); *A63F 13/235* (2014.09); *A63F 13/285* (2014.09); *H02J 7/00032* (2020.01); *H02J 7/0049* (2020.01); *A63F 2300/1031* (2013.01); *A63F 2300/1037* (2013.01)

(58) Field of Classification Search
CPC .................. A63F 13/235; A63F 13/285; A63F 2300/1031; A63F 2300/1037; H02J 7/00712; H02J 7/00032; H02J 7/0049
See application file for complete search history.

(56) References Cited

U.S. PATENT DOCUMENTS

| | | | | |
|---|---|---|---|---|
| 8,559,892 | B2 * | 10/2013 | Shimizu | A63F 13/73 |
| | | | | 455/74.1 |
| 8,665,214 | B2 * | 3/2014 | Forutanpour | H04W 52/0254 |
| | | | | 345/158 |
| 8,798,685 | B2 * | 8/2014 | Stekkelpak | G06F 1/3212 |
| | | | | 455/574 |
| 9,058,128 | B1 * | 6/2015 | Robison | H04W 52/0261 |
| 9,285,851 | B2 * | 3/2016 | Hodges | H01M 10/441 |
| 9,385,557 | B2 * | 7/2016 | Causey | H02J 50/10 |
| 10,516,280 | B2 * | 12/2019 | Tamaki | G06F 1/1671 |
| 10,903,665 | B2 * | 1/2021 | Prabhakar | G06F 1/3203 |
| 11,165,270 | B2 * | 11/2021 | Owen | H01M 10/425 |
| 11,656,666 | B2 * | 5/2023 | Jahagirdar | H02J 7/34 |
| | | | | 713/320 |

(Continued)

*Primary Examiner* — Jared Fureman
(74) *Attorney, Agent, or Firm* — Rainier Patents, P.S.

(57) ABSTRACT

This document generally relates to techniques for adaptively triggering charging notifications for a battery-powered user device. One example includes a method or technique that can be performed on a computing device. The method or technique can include obtaining a battery charge level of a battery of a battery-powered user device and accessing user data for a user of the battery-powered user device. The user data can reflect previous usage sessions of the user with the battery-powered user device. The method or technique can also include predicting a future usage session of the user with the battery-powered user device based on the user data. The method or technique can also include estimating confidence that the battery will last through the future usage session based on the battery charge level and the predicted future usage session. The method or technique can also include triggering a charging notification prior to the future usage session based on the estimated confidence.

20 Claims, 12 Drawing Sheets

(56)　　　　　References Cited

U.S. PATENT DOCUMENTS

| | | | |
|---|---|---|---|
| 11,742,680 B2 * | 8/2023 | Elidrissi ................. | H02J 7/007 |
| | | | 320/100 |
| 11,984,739 B1 * | 5/2024 | Smith ................. | H02J 7/00034 |
| 12,220,629 B2 * | 2/2025 | Suzuki .................... | H04Q 9/00 |
| 2008/0201587 A1 * | 8/2008 | Lee ................... | H04W 52/0261 |
| | | | 713/320 |
| 2012/0210325 A1 * | 8/2012 | de Lind van Wijngaarden ......... | |
| | | | H04W 52/0258 |
| | | | 718/103 |
| 2012/0254634 A1 * | 10/2012 | Chakra .................... | G06F 1/28 |
| | | | 713/300 |
| 2015/0123595 A1 * | 5/2015 | Hussain ............. | H02J 7/00712 |
| | | | 320/107 |
| 2016/0275400 A1 * | 9/2016 | Hodges .............. | H02J 7/00047 |
| 2017/0346303 A1 * | 11/2017 | Vanblon ............... | G06F 16/2358 |
| 2018/0115170 A1 * | 4/2018 | Bacarella ............. | H02J 7/0047 |
| 2018/0145514 A1 * | 5/2018 | Prabhakar ............. | H02J 7/0071 |
| 2024/0429730 A1 * | 12/2024 | Abbott .................. | H01M 10/46 |
| 2025/0117042 A1 * | 4/2025 | Choi ....................... | G06F 3/162 |

* cited by examiner

VIDEO GAME
SCENARIO 100

104

108

106

102

700

METHOD 1100

1102

OBTAIN BATTERY CHARGE LEVEL

1104

ACCESS USER DATA

1106

PREDICT FUTURE USAGE SESSION

1108

ESTIMATE CONFIDENCE

1110

TRIGGER CHARGING NOTIFICATION

METHOD <u>1200</u>

1202

IDENTIFY CANDIDATE NOTIFICATION WINDOWS

1204

PREDICT FUTURE USAGE SESSION

1206

SELECT PARTICULAR CANDIDATE NOTIFICATION WINDOW

1208

TRIGGER NOTIFICATION

ADAPTIVE BATTERY MANAGEMENT

BACKGROUND

Rechargeable battery technology has improved markedly in recent years. User devices ranging from video game controllers to electric cars can last for hours on a single charge. While users generally prefer devices that can last longer on a single battery charge, users may tend to forget to recharge devices with long-lasting batteries because of the infrequent charge intervals.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to techniques for adaptively triggering charging notifications for a battery-powered user device. One example includes a method or technique that can be performed on a computing device. The method or technique can include obtaining a battery charge level of a battery of a battery-powered user device and accessing user data for a user of the battery-powered user device. The user data can reflect previous usage sessions of the user with the battery-powered user device. The method or technique can also include predicting a future usage session of the user with the battery-powered user device based on the user data. The method or technique can also include estimating confidence that the battery will last through the future usage session based on the battery charge level and the predicted future usage session. The method or technique can also include triggering a charging notification prior to the future usage session based on the estimated confidence.

Another example includes a system having a hardware processing unit and a storage resource storing computer-readable instructions. When executed by the hardware processing unit, the computer-readable instructions can cause the system to obtain a battery charge level of a battery of a battery-powered user device. The computer-readable instructions can also cause the system to access user data reflecting previous usage by a user of the battery-powered user device and predict future usage by the user of the battery-powered user device. The computer-readable instructions can also cause the system to trigger a charging notification for the battery-powered user device based on the battery charge level and the predicted future usage.

Another example includes a computer-readable storage medium. The computer-readable storage medium can store instructions which, when executed by a computing device, cause the computing device to perform acts. The acts can include identifying, based on user data, a plurality of candidate notification windows for outputting a charging notification to a user of a battery-powered user device. The acts can also include predicting a future usage session by the user of the battery-powered user device and, based on the predicted future usage session, selecting a particular notification window from the plurality of candidate notification windows. The acts can also include triggering the charging notification for the battery-powered user device to occur during the particular notification window.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Overview

One way to remind a user to recharge the batteries in a given device is a simple warning light or sound. For example, when a rechargeable battery in a device falls below a static threshold, an LED on the device can change color or a low battery alarm sound can be emitted by the device. However, usage patterns of rechargeable devices can vary widely, and static warning thresholds do not necessarily work well for certain usage patterns.

For example, consider a wireless video game controller that can play approximately 50 hours of video games on a single charge. For a user that averages one hour per day of game play, the user can go almost two months without recharging the controller. While the user may enjoy the fact that the device needs to be recharged infrequently, the user may also tend to forget to recharge the device. Suppose a static warning threshold is employed that warns the user to recharge the device when approximately two hours of usage time remain. If the user's next gaming session lasts for more than two hours, the controller will cease functioning during game play, leading to a frustrating user experience.

From the perspective of the manufacturer of the video game controller, one approach is to find a "one size fits all" warning threshold that accommodates a wide range of typical users. However, user behaviors can vary widely, not only in how they use a given rechargeable device but also their daily life routines. Thus, even a very carefully chosen static warning threshold will tend to frustrate certain users at certain times.

The disclosed implementations offer adaptive battery charging notification techniques that consider factors such as device usage patterns, user habits and schedule, application characteristics, and battery characteristics to trigger battery charge notifications. By tailoring battery charge notification timing to the circumstances of individual users, the disclosed implementations can allow users to take advantage of rechargeable devices with long runtimes while still reminding users to recharge their devices in time to avoid a failure during their next usage session.

Video Game Usage Scenario

Figure 1:
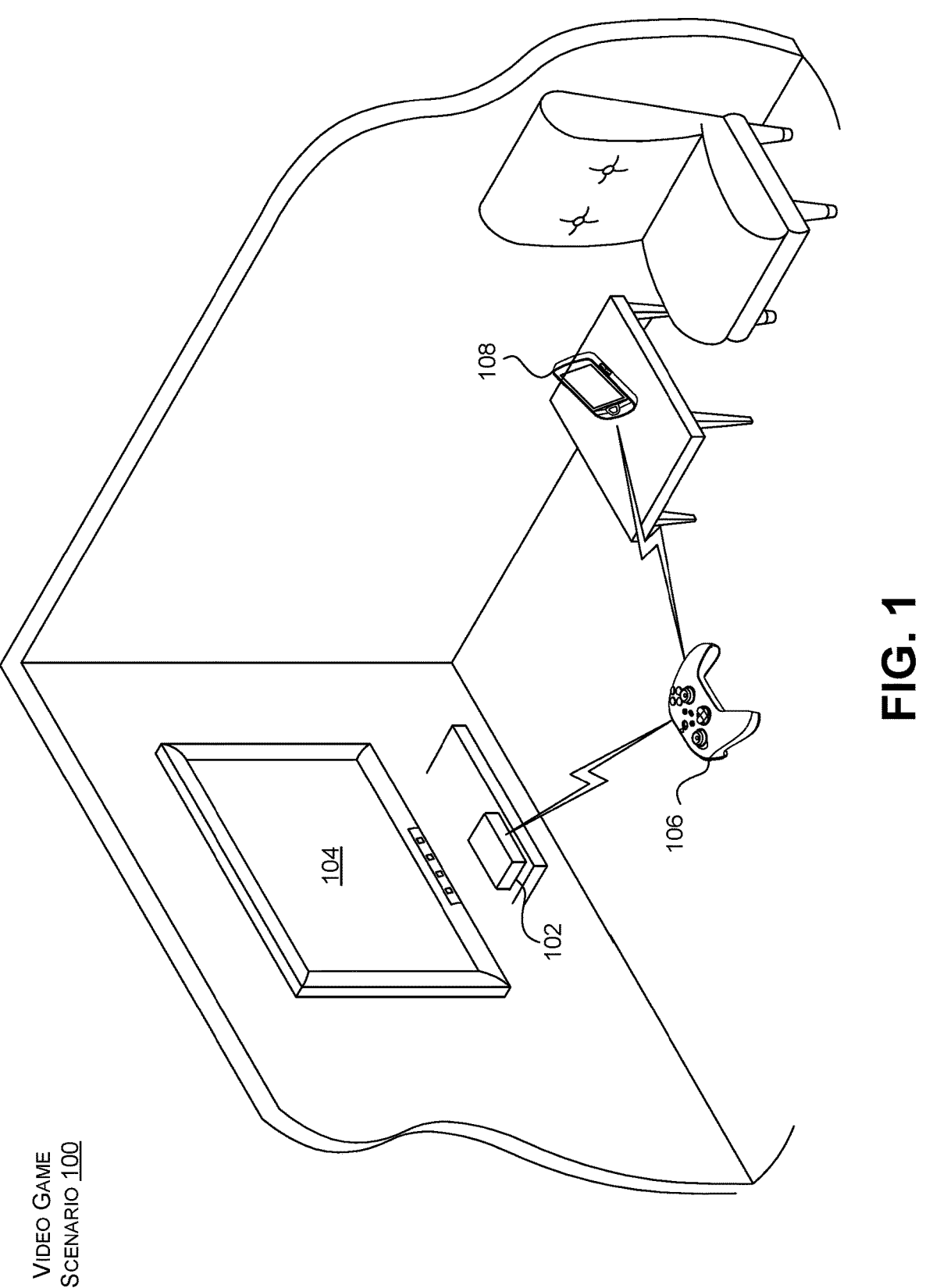
FIG. 1 illustrates an example video game scenario in which the present concepts can be employed.

The following describes how the disclosed techniques can be employed to provide adaptive charging notifications in a video game scenario 100, shown in FIG. 1. However, note that the video game scenario is exemplary and, as discussed more below, adaptive charging notifications can be provided in a wide range of other usage scenarios and technical environments.

Scenario 100 involves a video game console 102 that outputs a video game on a display 104. A user can control the video game console with a video game controller 106. The user's mobile device 108 can communicate with the controller, the console, and/or a remote server, as described more below. The video game controller is one example of a battery-powered user device that can be powered by a rechargeable battery.

As discussed more below, an adaptive battery charging notification can be triggered based on information such as user data, application data, and/or battery data. The adaptive battery charging notification can be output on any of the devices shown in FIG. 1. As one example, the video game console 102 can output a message on the display 104 instructing the user to recharge the video game controller 106. As another example, the video game controller can have an LED that illuminates to indicate that the controller should be charged, and/or the console can have a similar LED. As yet another example, the mobile device 108 can have an application that outputs an indication that the controller should be recharged.

In some cases, logic on the console 102, the display 104, the video game controller 106, the mobile device 108, and/or a remote server can determine when to trigger the battery charging notification. As one example, in some cases the console can have a wireless connection (e.g., using a console-to-controller wireless communication protocol) to the video game controller, and the console can send an instruction over that connection that causes the video game controller to illuminate a charging notification LED. As another example, in some cases the mobile device can have a wireless connection (e.g., Bluetooth) to the video game controller, and the mobile device can send an instruction over that connection that causes the video game controller to illuminate a charging notification LED. In other examples, the console and/or mobile device can communicate with each other using a local wireless link or with a remote server to receive instructions from other devices and cause charging notifications to be presented on the mobile device and/or display.

Notification Triggering Workflow

Figure 2:
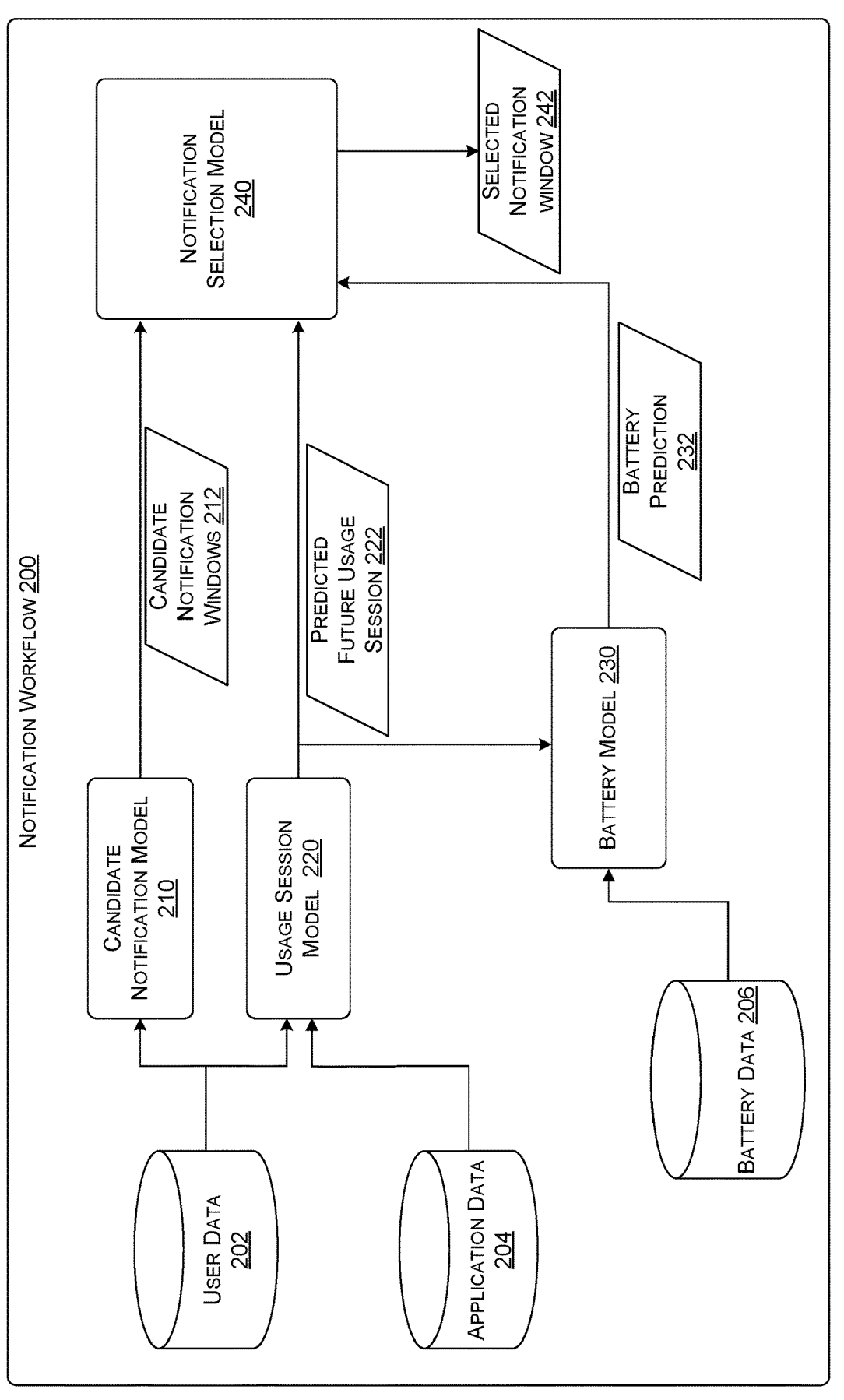
FIG. 2 illustrates an example workflow for triggering a charging notification during a selected notification window, consistent with some implementations of the present concepts.

FIG. 2 illustrates an example notification workflow 200 that employs various types of data to trigger charging notifications. User data 202 can include information relating to one or more users, such as previous usage sessions when the user has used a battery-powered device, what applications were used during the previous usage sessions, travel habits of the user, work habits of the user, a user calendar, user preferences, etc. Application data 204 can include information relating to one or more applications, such as the type of application (e.g., video game, movie, productivity, social media, etc.), types of input/output used by the application (e.g., haptic, chat features, etc.), specific times when the application is available to be downloaded or executed, etc. Battery data 206 can include information relating to one or more batteries of the battery-powered device, such as the current charge level, a discharge rate when the battery is used with a particular application, or a recharge rate when the battery is connected to a charger.

Candidate notification window model 210 can access the user data 202 to determine one or more candidate notification windows 212 when a user will be available to receive a charging notification. For instance, if the user is typically asleep during certain hours and away from home during other hours, then those times can be excluded and other time windows can be designated as candidate notification windows. Additional details on candidate window identification are provided below.

Usage session prediction model 220 can access the user data 202 and the application data 204 to predict a future usage session 222. For instance, if the user data indicates that a user tends to use a particular application at a particular time every Friday for a particular duration of time, then the predicted future usage session can be another session of that same duration on the next upcoming Friday. In some cases, application data can help facilitate the prediction of usage sessions, e.g., if the application data indicates that a new baseball game will be available next Friday and the user data indicates that the user has a strong tendency to play new sports games the first day that they are released, then the predicted future usage session can identify that new baseball game as the predicted application even if the user has not previously played that specific game.

Battery model 230 can receive the predicted future usage session 222 and the battery data 206 to make a battery prediction 232. For instance, the battery prediction can reflect an estimated confidence that the battery will last through the predicted future usage session given a current charge level of the battery. In some cases, the battery prediction can simply be a Boolean value indicating whether the estimated remaining run time of the battery exceeds the estimated duration of the predicted future usage session. In other cases, the battery prediction can include a numerical confidence value or score reflecting how likely the battery is to expire during the predicted future usage session.

Notification window selection model 240 can receive the candidate notification windows 212, the predicted future usage session 222, and the battery prediction 232. If the battery prediction indicates low confidence (e.g., below a threshold) that the battery will last for the entire predicted future usage session, the notification selection model can choose one of the candidate notification windows as selected notification window 242 to output a charging notification. For instance, as described more below, the notification selection model can consider user preferences, recharge times, user calendar information, as well as other factors to ensure that the user is given sufficient time to recharge their device without disrupting the user's other activities.

Candidate Notification Window Model Examples

As noted above, user data can be used by the candidate notification window model 210 to inform when the user is likely available to charge a device. For certain devices such as video game controllers that tend to be used only at home, a user may prefer to be home to recharge that device, e.g., the user may not wish to take their device to work for recharging. If the user receives a charging notification when they are away from home, the user may forget to charge the device when they return home. Thus, the user's travel history and/or work habits can be used to infer appropriate times to notify the user to charge their device. In addition, the user's calendar can also provide important information, e.g., if the calendar has an entry indicating the user will be away from home or otherwise unavailable (e.g., on a conference call) at a time when the user would typically be available to charge their device.

One type of model that can be employed to identify candidate notification windows is a rules-based algorithm. For instance, a simple Boolean yes/no value could indicate whether a user is available or not. That value could be based on explicit user input identifying times when the user will be available, inferred from the user's calendar appointments, predicted from the user's history, etc. As another example, the model could also consider the user's likely location. For instance, the user's calendar may indicate they are free all week, but the user may tend to work in the office on Monday through Thursday and work from home on Friday. For a device that tends to be recharged at home, certain candidate notification windows might occur on Friday, Saturday, Sunday, or after work on Monday through Thursday, and for a device that tends to be charged in the office, the candidate notification windows might occur during work hours from Monday through Thursday. Additional rules could be defined for travel times, e.g., users might prefer to receive charging notifications when travelling to the office in the morning or returning home in the evening.

A machine-learning model could also be employed for identifying candidate notification windows. For instance, some implementations can track whether and when users actually charge their devices. Those times can be used as positive labels for supervised learning of a neural network or other model to encourage the model to learn to select candidate notification windows that ultimately result in the user charging their device. Similarly, negative labels can be provided when users decline to charge their devices after receiving a charging notification. In other implementations, reinforcement learning can be employed using a reward function that considers factors such as whether the user charges their device, whether the user is interrupted at work by the notification, etc.

In some cases, the candidate notification window model 210 can run continuously or periodically irrespective of battery usage by the user. The candidate notification window model can emit a stream of candidate notification windows 212 that could be used to notify a user to charge their battery. As discussed more below, a specific candidate window for notifying a user to recharge their battery can subsequently be chosen from the candidate notification windows.

Usage Session Prediction Model Details

To predict a future usage session, the usage session prediction model 220 can consider user data 202, which can include previous usage history for the user. For instance, the user data might identify the times and durations of previous usage sessions as well as what applications were used during those sessions. For instance, a given user might consistently play the same game for three hours every Friday evening from 7 PM to 10 PM. Another user might tend to play every Friday evening at 7 PM, but play different games for different lengths of time. The usage session prediction model can predict future usage sessions based on these tendencies.

In addition, some users may have taken explicit actions that inform future application usage. Consider a user that has downloaded part of a game that will be released on the next Friday evening at 7 PM. The fact that the user has partially downloaded the game can suggest that they are likely to download the remainder of the game and begin using the game immediately at a predetermined time when the remainder of the game is available. As another example, if the user is very close to achieving some in-game objective or has entered an upcoming gaming tournament, this can suggest that the user is likely to increase their game play in the near future. As a further example, if a user has purchased or subscribed to a particular game, this information can also be used to infer that the user will likely play that game in a future usage session.

As another example, application data 204 may convey information about upcoming releases. Because certain users may tend to play specific types of games whenever they become released, this information can be employed by the usage session prediction model 220 to predict the future usage session 222. For instance, certain users may tend to play new baseball games extensively whenever they are first released, and thus the predicted future usage sessions for those users could involve using new baseball games immediately after their release. As another example, certain users may have a subscription service that allows limited, temporary use of a set of designated games. Thus, the predicted future usage sessions could involve the use of whatever games will be available at the time of the future usage sessions. Users may also tend to use a video game console for applications such as watching television shows or movies, in which case the timing of a given television show or movie can be used for predicting future usage sessions.

In some cases, the predicted future usage session 222 also conveys information about the predicted application. For instance, the predicted future usage session can indicate whether the predicted application supports haptic or chat features. In some cases, the application data can include historical information that conveys how other users have tended to use the predicted application, e.g., both a chess and tennis game may support chat features, but users of the chess game may be less likely to employ headphones to chat while playing chess than users of the tennis game. As another example, two applications may both support haptic output, but one application may tend to produce significantly more haptic output than another application.

One type of model that can be employed to predict usage sessions is a rules-based algorithm. For instance, one algorithm could involve simply assuming that the user will duplicate the previous usage session, e.g., use the same application on the same day of the week, at the same time, and for the same duration as the most recent previous usage session. Other rules could be defined where a weighted average of previous usage session durations is employed to predict the duration of the future usage session. Other rules could map certain time periods to specific prediction rules, e.g., different rules for weekdays vs. weekends, etc.

In other implementations, machine learning can be employed to predict future usage sessions. For instance, a classification model can be trained to predict the application that a user will employ in their next future usage session, and a regression model can be trained to predict the duration of that future usage session. Previous usage sessions can be employed as training data for such a model using supervised or reinforcement learning techniques. In some cases, data for other users can be employed as well, e.g., for model training and/or to cluster users together so that different predictions can be made for users in different clusters. Machine learning can also be employed to predict the usage of specific application features such as haptic or chat features which can influence battery consumption, as described more below.
Battery Prediction Model Examples The battery model 230 can consider both battery data 206 and predicted future usage session 222 to estimate a confidence that the battery will last through the predicted future usage session. The battery data can include the charge state of the battery as well as information conveying how quickly the battery can recharge or discharge. In some cases, a current battery voltage can be mapped directly to a remaining runtime, e.g., assuming a constant discharge rate.

In other cases, however, the battery discharge rate may vary over time, e.g., depending on characteristics of the application. For instance, if the future usage session involves the use of certain features that tend to drain battery power quickly will be used, this information can be used to adjust the predicted remaining runtime accordingly. For example, if the application is a specific game or a type of game that typically is used with an auxiliary headset, the predicted battery discharge rate can be higher than for other games or types of games where an auxiliary headset is not used. In some cases, the battery prediction 232 can also indicate how long the battery will take to recharge to a particular charge level e.g., to a fully charged level or at least long enough to last for the duration of a predicted future usage session.

The battery discharge rate can also vary with user characteristics, e.g., some users may also tend to use certain features more than others. For instance, some gaming controllers provide haptic feedback. If one user tends to play a particular game in a manner that generates more haptic feedback than other users, that user may tend to draw down their battery more quickly than other users with the same type of controller that play the same game.

As another example, some users may tend to employ auxiliary devices, such as headsets, more often than other users. The use of such a headset may tend to use battery power more quickly than usage sessions where the headset is not employed. In some cases, a user may tend to use their headset only when playing with specific friends or playing specific games. In such cases, the battery discharge rate can take into account what game the user is predicted to play and/or who they are predicted to play with.

Given the information set forth above, the battery model 230 can output a battery prediction 232 that conveys the estimated confidence that the battery will last through the future usage session. In some cases, this can be a simple Boolean value. One example algorithm for determining the value is to set the value to 1 if the predicted remaining runtime of the device exceeds the predicted duration of the future usage session, and to a value of 0 otherwise. In other cases, the confidence can be expressed as a score from a range of integer or floating-point values. If the score exceeds a threshold, the battery prediction can indicate that the device is predicted to last through the future usage session, and otherwise that the device is not predicted to last through the future usage session.

In other cases, machine learning can be employed to predict whether the battery will last through the future usage session. For instance, a binary classifier can be trained to output a yes/no value, with the classifier being trained on positive examples where the device did last through the predicted usage session and negative examples where the device did not last. In other cases, reinforcement learning or other approaches can be employed by defining a reward function that considers whether the device lasted through the predicted usage session, potentially with other factors also represented in the reward function. Further implementations can employ regression techniques to estimate how long the battery will last in view of factors such as predicted haptic output during the predicted future usage session.
Notification Window Selection Model and Example Timelines As noted previously, the notification window selection model 240 can choose the selected notification window 242 from the candidate notification windows 212 based on the predicted future usage session 222 and the battery prediction 232. The following example timelines illustrate how various criteria can influence which candidate notification window is selected.

Figure 3:
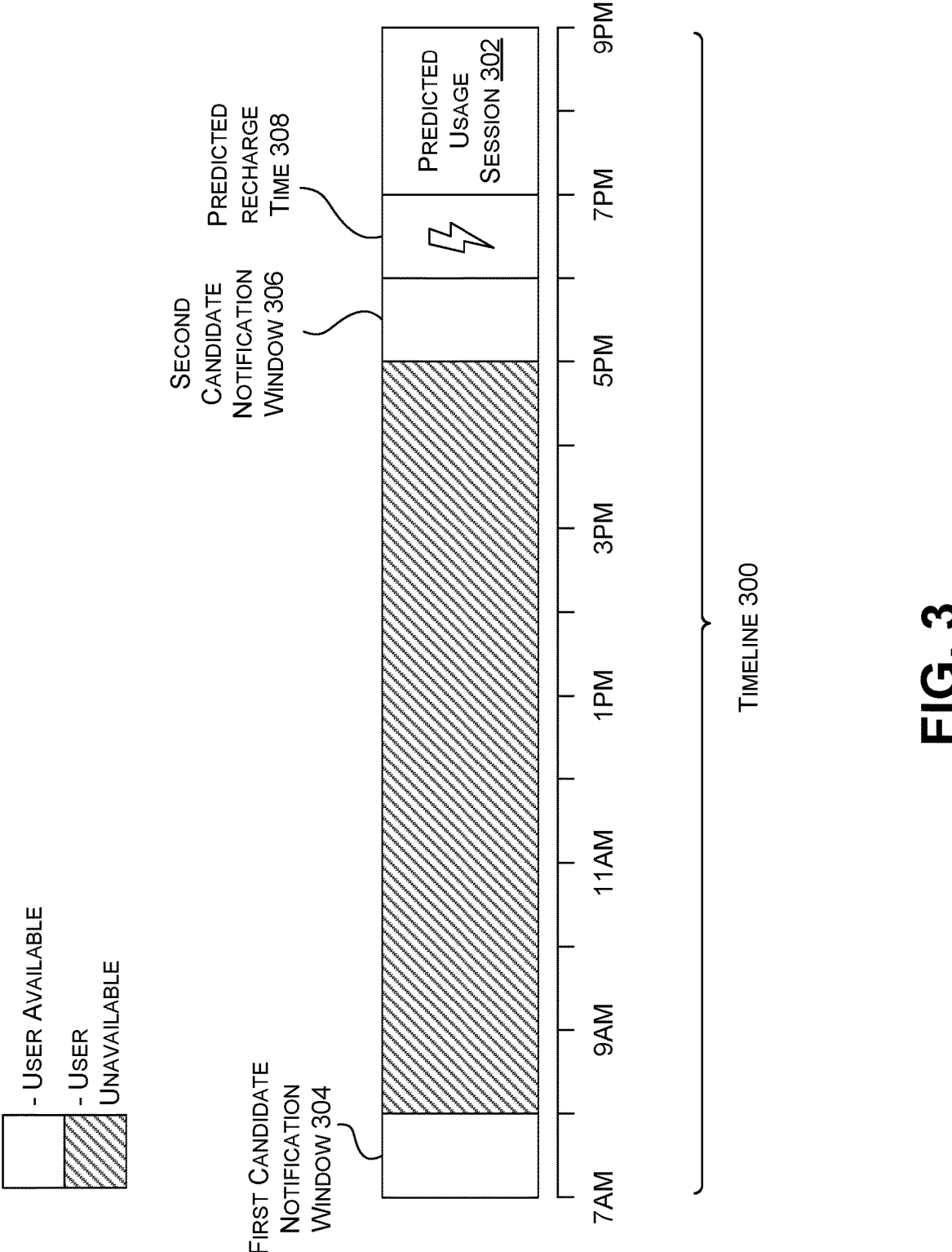
FIGS. 3-5 illustrate example charging notification timelines, consistent with some implementations of the disclosed techniques.

FIG. 3 illustrates an example timeline 300 where a predicted usage session 302 lasts from 7 PM until 9 PM. A first candidate notification window 304 starts at 7 AM and lasts one hour, and a second candidate notification window 306 starts at 5 PM and lasts one hour. Predicted recharge time 308 is also one hour, e.g., the device will take one hour to recharge fully or at least sufficiently to last through the predicted usage session.

Assume, for the purposes of this example, that the user has preferences specifying evening notifications are preferred over morning notifications. Here, the second candidate notification window 306 can be selected by the notification window selection model 240 and the user can be notified at 5 PM to charge their device. This provides sufficient time to recharge the device while honoring the user's specified preferences.

Figure 4:
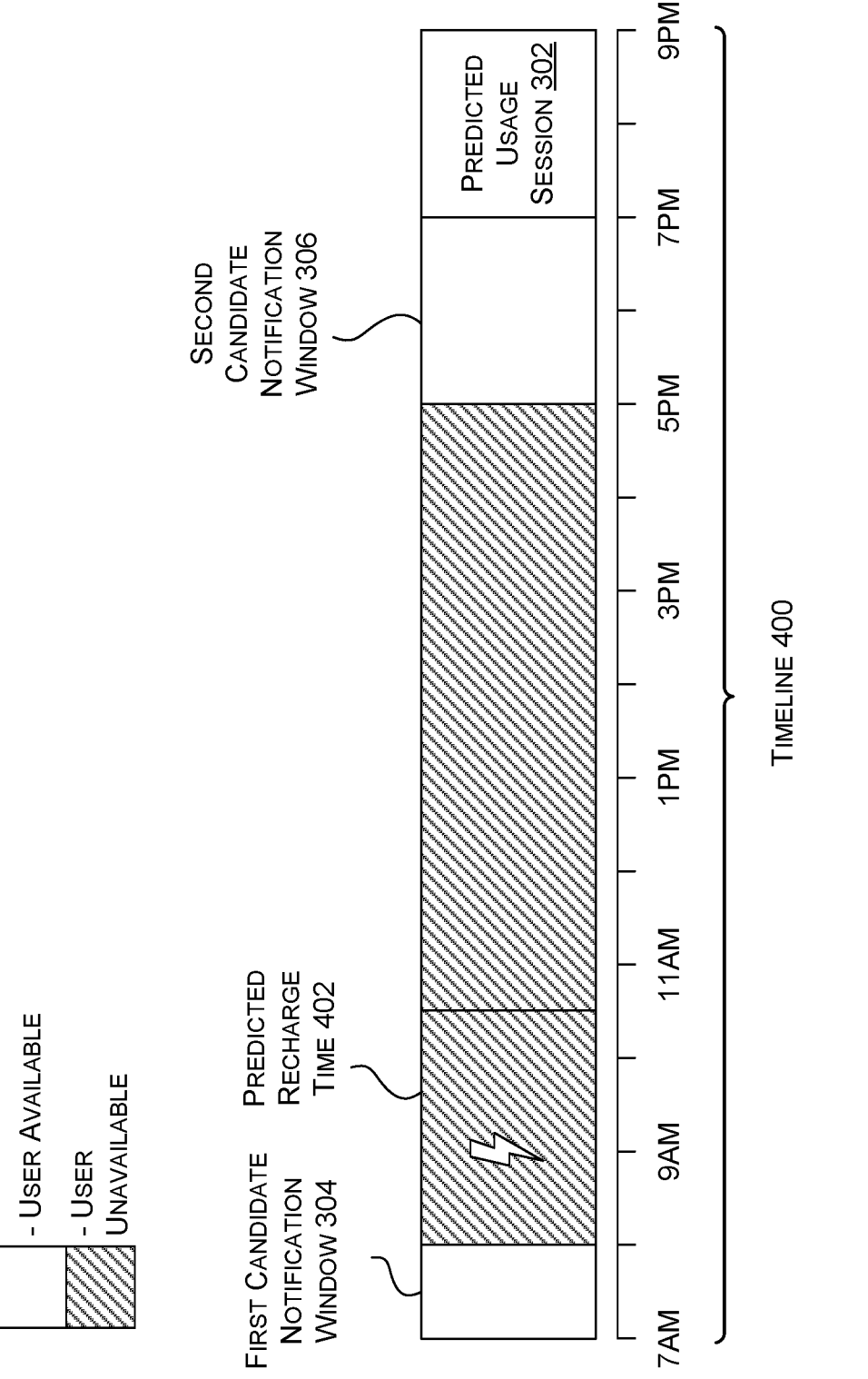

FIG. 4 illustrates another example timeline 400, similar to timeline 300 with the same predicted usage session 302, first candidate notification window 304, and second candidate notification window 306. However, in this case, predicted recharge time 402 is 2.5 hours. In this case, the second candidate notification window starts only two hours before the predicted usage session, which leaves insufficient time to recharge the device. Thus, the first candidate notification window 304 is selected by the notification window selection model 240 so that the device has time to recharge sufficiently to last for the predicted usage session.

Figure 5:
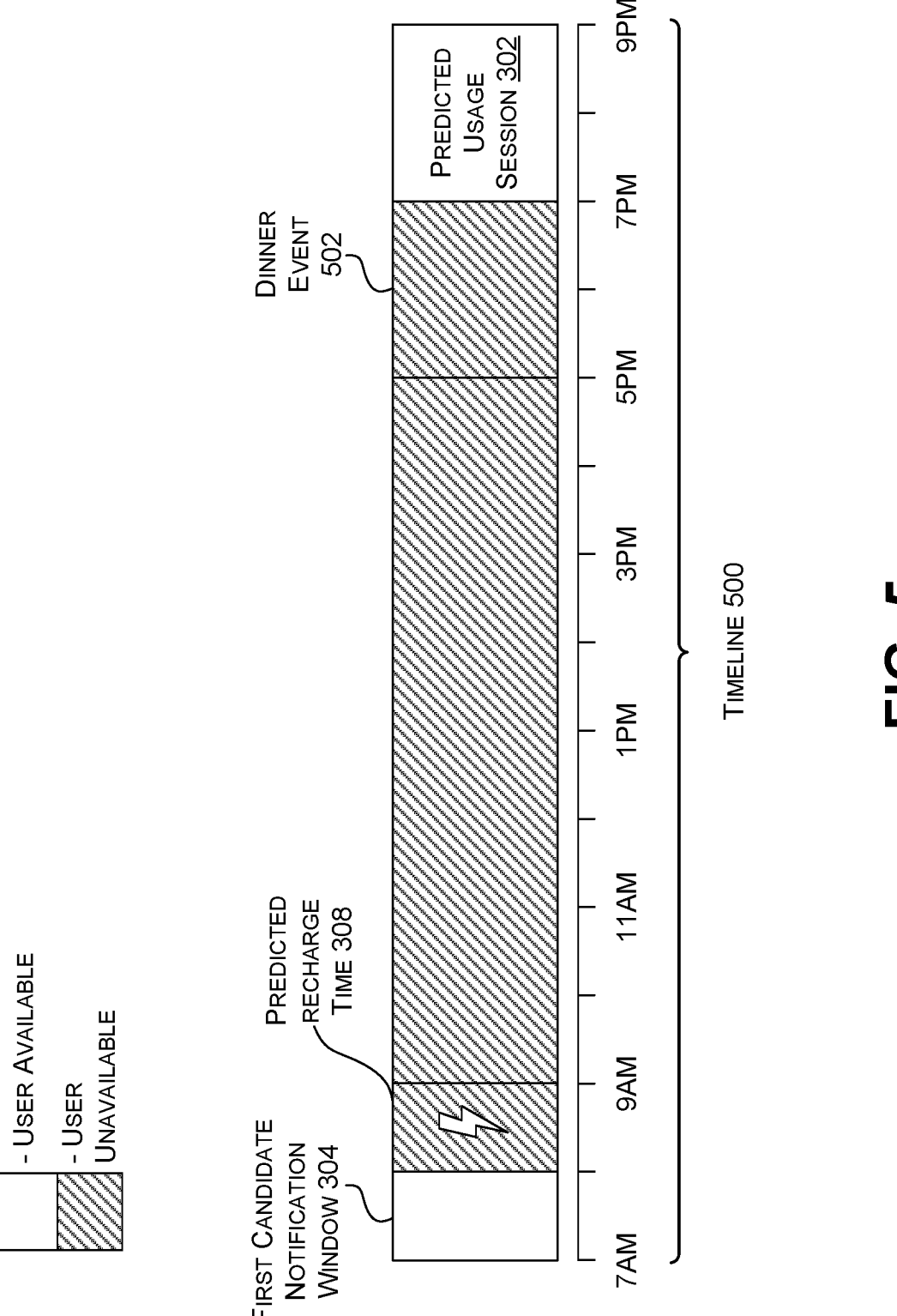

FIG. 5 illustrates another example timeline 500, similar to timeline 300. However, in this case, the user has a scheduled dinner event 502 at 5 PM. Thus, the second candidate notification window 306 shown in FIG. 3 is not available. As a consequence, the first candidate notification window 304 is selected by the notification window selection model 240.

The notification window selection model 240 can also consider additional factors, such as the user's current location, in deciding when to trigger a charging notification for a given user. For example, consider a battery-powered user device that a user tends to charge only at home. With the user's permission, the location service (e.g., GPS) on their mobile device can share the user's location with the notification window selection model so that the charging notification occurs when the user is at home.

As one use case, consider a user that typically returns home at 5 PM on Thursdays and typically plays games on Friday evening. The user may typically receive a charging notification at 5 PM on Thursday based on the location service indicating that the user has arrived at home. However, if the user stays at work until 9 PM on a particular Thursday, the charging notification can be delayed on that Thursday until 9 PM when the location service indicates the user arrives at home. Thus, the user does not receive the charging notification when they are at work and likely to forget by the time they return home, but rather once they return home so that the can plug in the device upon receiving the notification.

Example Charging Notifications

The following description provides various examples of how charging notifications can be conveyed for video game scenarios. As described elsewhere herein, however, the disclosed techniques can be readily employed in a wide range of technical environments besides video gaming, and the specific examples set forth below are just a few of the many possible ways that a charging notification can be output to a user.

Figure 6:
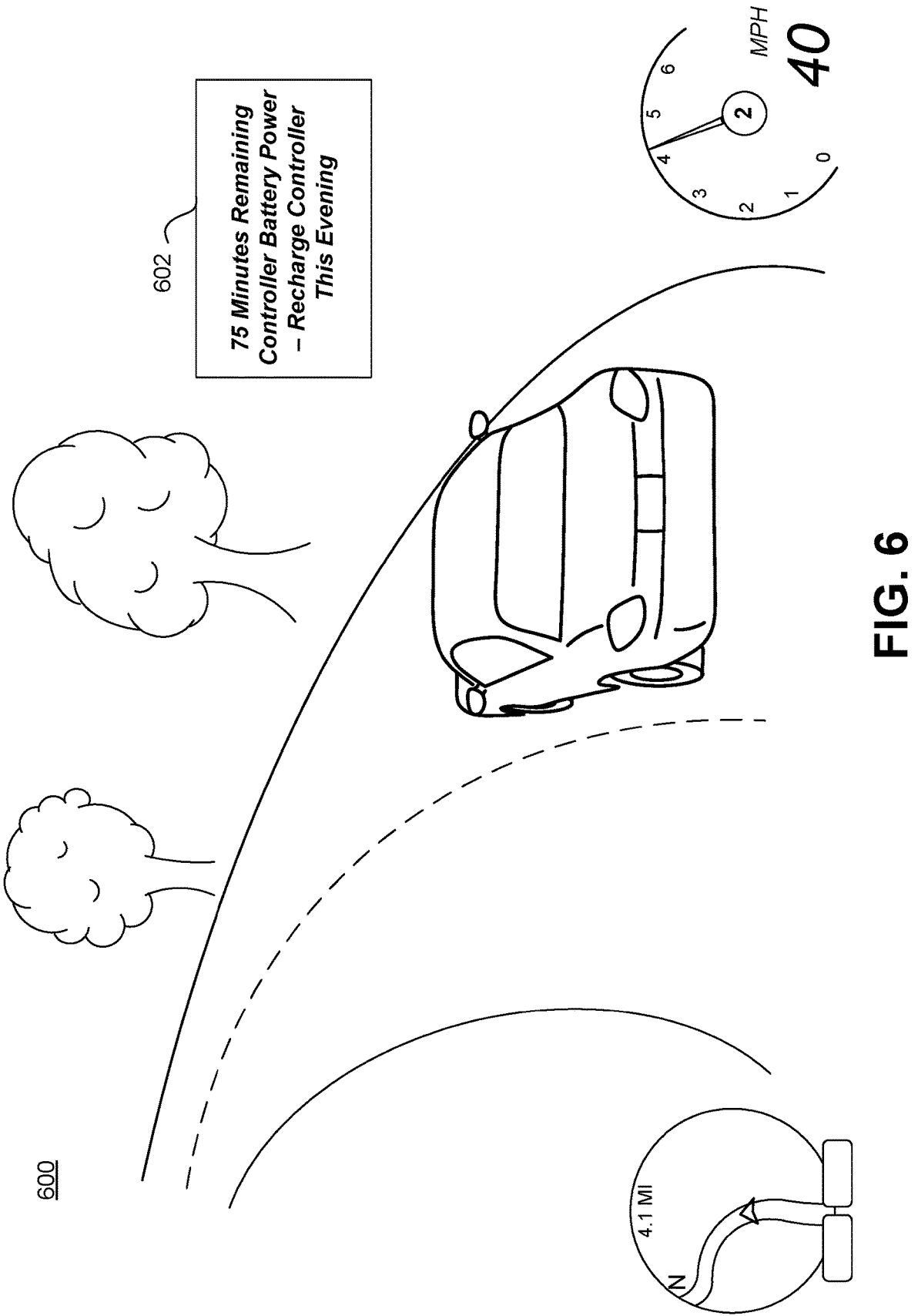
FIG. 6 illustrates an example charging notification provided via a video game, consistent with some implementations of the disclosed techniques.

FIG. 6 illustrates an example gaming notification scenario 600 where a notification 602 is displayed to a user while using a particular application, e.g., a driving game. For instance, referring back to FIG. 1, charging notification 602 can be displayed on display 104 while the user is playing a game with video game controller 106. This can be accomplished by having the console configure the game to display the charging notification during gameplay. In some cases, the charging notification is delayed until a stopping point within the game, e.g., when a user finishes a game or completes a level of a game.

Figure 7:
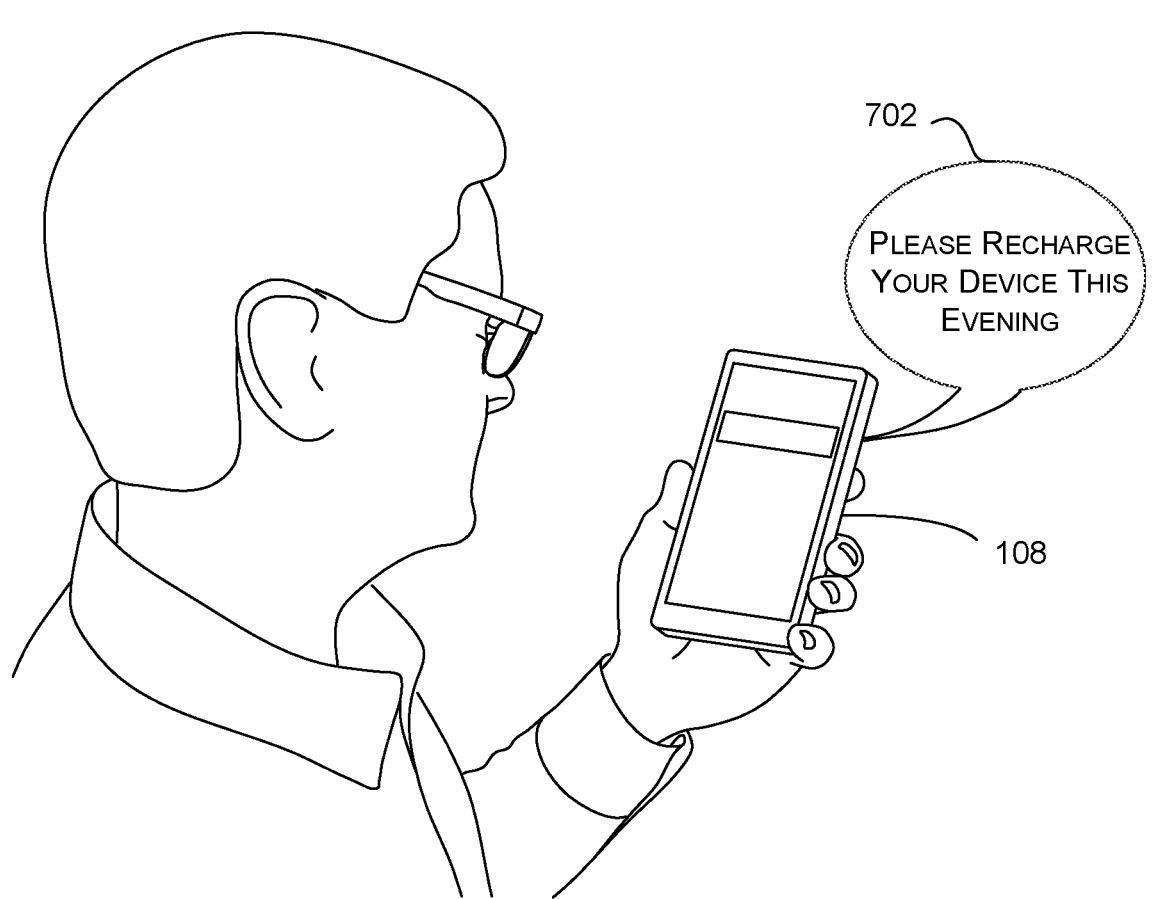
FIG. 7 illustrates an example charging notification provided via a mobile user device, consistent with some implementations of the disclosed techniques.

FIG. 7 illustrates an example mobile device notification scenario 700 where a charging notification 702 is spoken by mobile device 108. Note that charging notifications can also be displayed on the mobile device or output by other means (e.g., haptic feedback).

Figure 8A:
FIG. 8A illustrates an example charging notification provided via a battery-powered user device, consistent with some implementations of the disclosed techniques.

FIG. 8A illustrates an example where a battery-powered device such as video game controller 106 has an LED 802 that can illuminate to provide a charging notification to a user. In some cases, the video game controller can illuminate the LED responsive to receiving an instruction from another device (e.g., the console or mobile device) to do so. In other cases, the video game controller can receive a voltage threshold that is set based on the predicted duration of the future usage event, and can illuminate the LED once the battery voltage falls below that threshold.

Figure 8B:
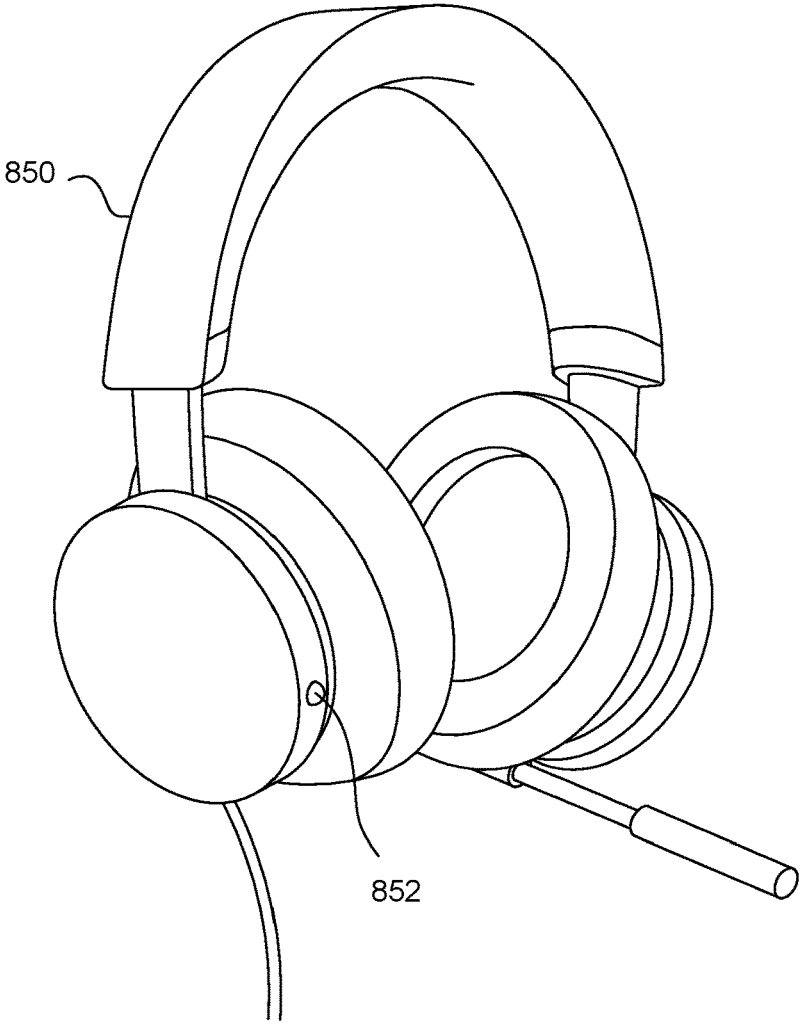
FIG. 8B illustrates an example charging notification provided via an auxiliary user device that can be powered by a battery-powered user device, consistent with some implementations of the disclosed techniques.

FIG. 8B illustrates an example where an auxiliary device such as headset 850 has an LED 852 that can illuminate to provide a charging notification to a user. An auxiliary device can be any separate device that can be powered by a battery-powered device, such as a headset that plugs into a video game controller to draw power therefrom. The LED 852 can be illuminated responsive to an instruction received from the video game controller 106 or another device.

Figure 9:
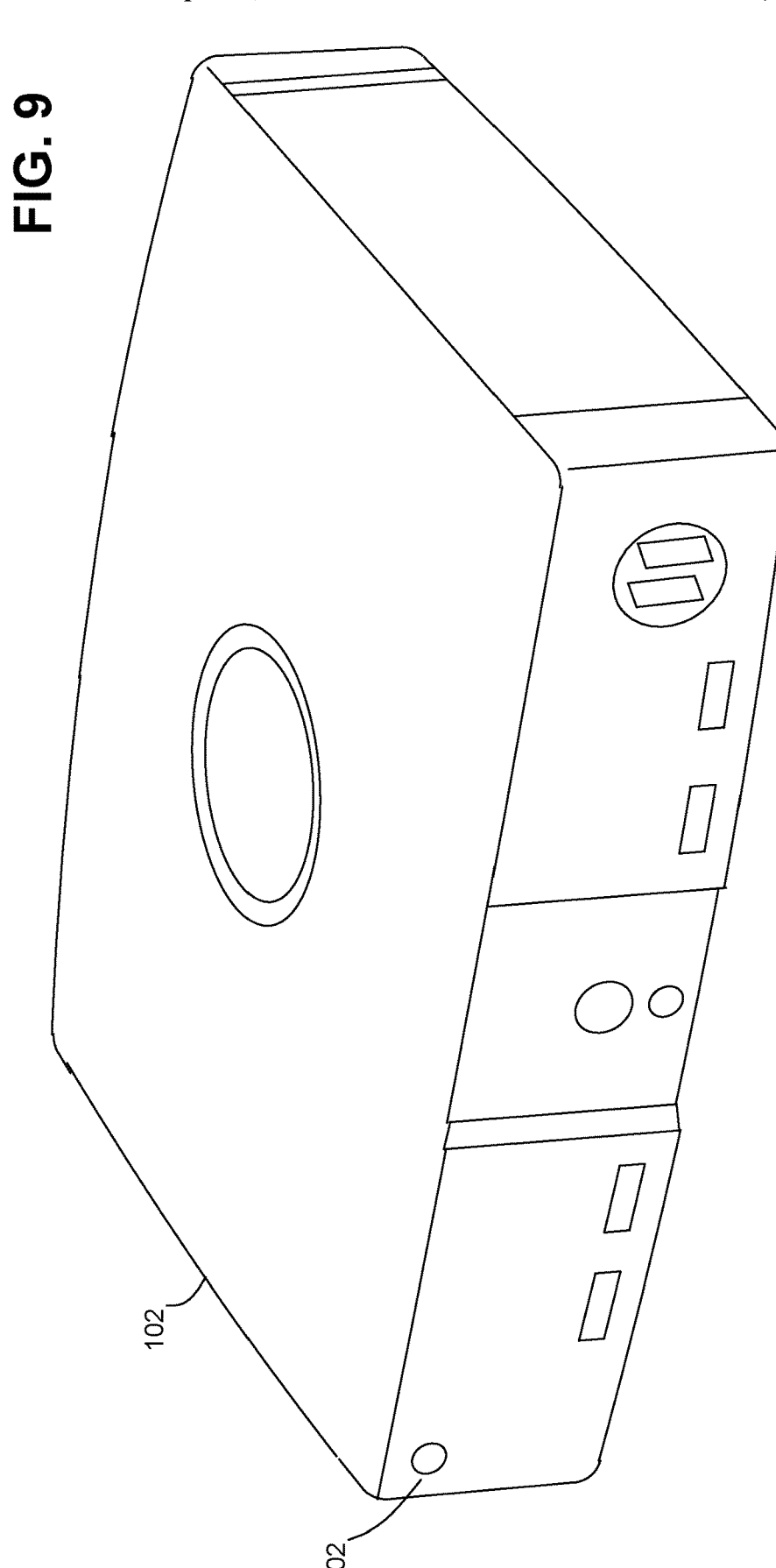
FIG. 9 illustrates an example charging notification provided via a computing device that can be controlled by a battery-powered user device, consistent with some implementations of the disclosed techniques.

FIG. 9 illustrates an example where console 102 includes an LED 902 that can be illuminated to provide a charging notification to a user. This can particularly be useful for scenarios where the video game controller charges via USB from the console.

Example System

Figure 10:
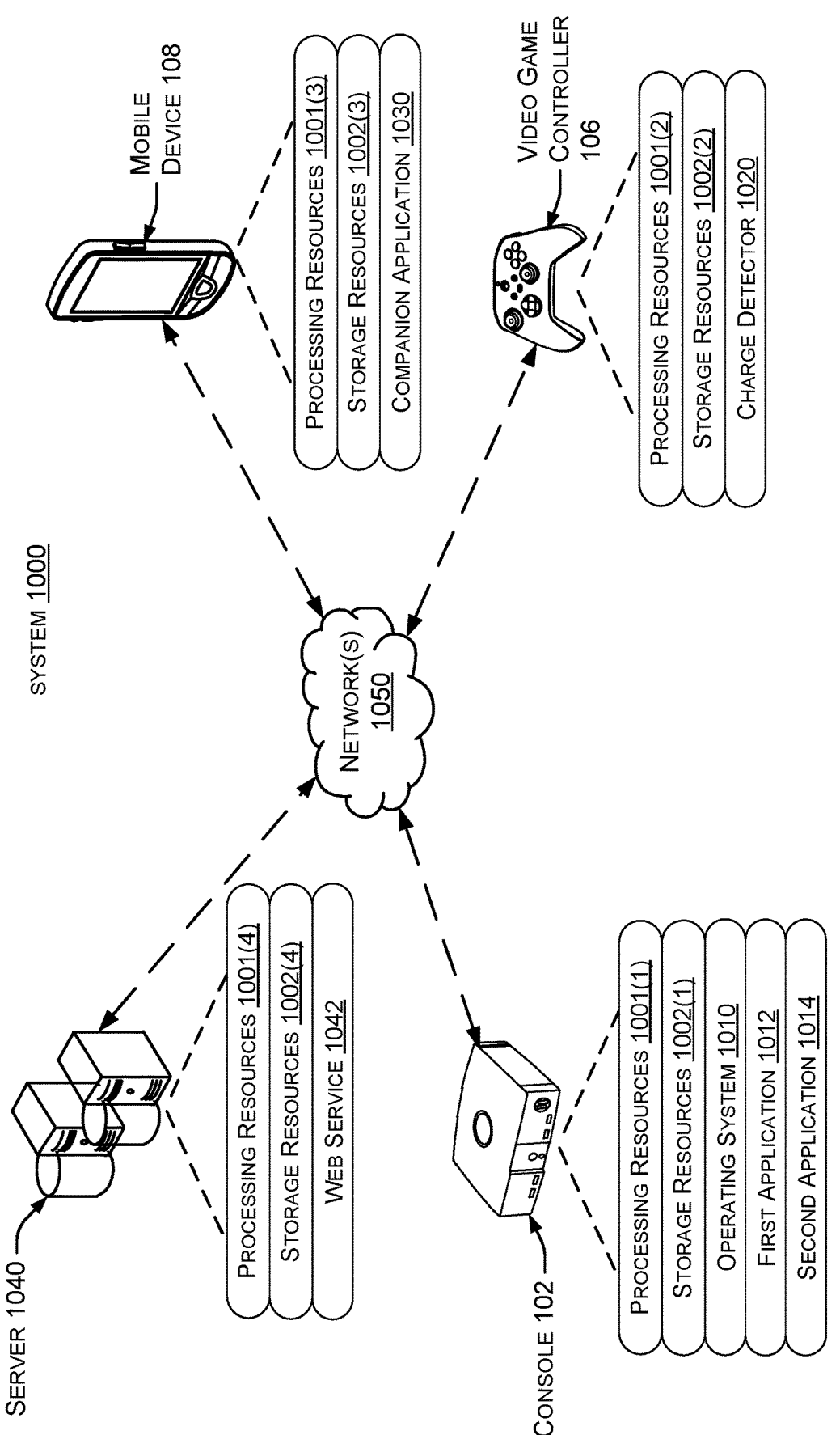
FIG. 10 illustrates an example system in which the present concepts can be employed.

The present implementations can be performed in various scenarios on various devices. FIG. 10 shows an example system 1000 in which the present implementations can be employed, as discussed more below. For consistency of the examples, the devices shown in FIG. 10 relate back to the video game scenario described above with respect to FIG. 1. However, as described more below, the disclosed techniques can readily be extended to other technical environments and device types.

As shown in FIG. 10, system 1000 includes console 102, video game controller 106, mobile device 108, and a server 1040, connected by one or more network(s) 1050. As described more below, networks 1050 can include wired or wireless networks, wide-area or local networks, as well as short-range communication channels between individual pairs of devices (e.g., WiFi direct, Bluetooth, proprietary wireless protocols, etc.). In some cases, any of the devices shown in FIG. 10, but particularly the servers, can be implemented in data centers, server farms, etc.

Certain components of the devices shown in FIG. 10 may be referred to herein by parenthetical reference numbers. For the purposes of the following description, the parenthetical (1) indicates an occurrence of a given component on console 102, (2) indicates an occurrence of a given component on video game controller 106, (3) indicates an occurrence on mobile device 108, and (4) indicates an occurrence on server 1040. Unless identifying a specific instance of a given component, this document will refer generally to the components without the parenthetical.

Generally, each device may have respective processing resources 1001 and storage resources 1002, which are discussed in more detail below. The devices may also have various modules that function using the processing and storage resources to perform the techniques discussed herein. The storage resources can include both persistent storage resources, such as magnetic or solid-state drives, and volatile storage, such as one or more random-access memory devices. In some cases, the modules are provided as executable instructions that are stored on persistent storage devices, loaded into the random-access memory devices, and read from the random-access memory by the processing resources for execution.

Console 102 can have an operating system 1010, a first application 1012, and a second application 1014. For instance, the first and second applications can be different video games. Video game controller 106 can have a charge level detector 1020 which detects a charge level (e.g., voltage) of one or more batteries that power the controller. Mobile device 108 can have a companion application 1030. Server 1040 can have a web service 1042.

In some implementations, notification workflow 200 can be implemented entirely by any of the operating system 1010 on the console 102, the companion application 1030 on the mobile device 108, and/or the web service 1042 on server 1040. In other implementations, parts of workflow 200 are distributed across individual devices. A few specific example implementations are described below In one example, web service 1042 on server 1040 provides supporting features for applications, such games, that can execute on console 102. For instance, web service 1042 can store application data for games that the web service provides for downloading or streaming, can maintain user data such as user profiles reflecting user achievements and usage behavior, etc. The console can periodically poll the video game controller 106 for battery data such as current charge state and report the battery data to the web service. The web service can then estimate the confidence that the battery of the video game controller will last through a future usage session and, based on that confidence, trigger a charging notification, e.g., when the confidence falls below a threshold.

As one example, the web service 1042 can trigger a charging notification by sending an instruction over a cellular network to the companion application 1030 on the mobile device 108. The companion application can generally provide functionality for interfacing with the web service 1042, e.g., allowing users to manage their profiles, schedule games for downloading, manage accounts for gaming subscriptions, etc. The companion application can output a charging notification to the user, e.g., as shown in FIG. 7. In some cases, the companion application can, with user permission, share the user's calendar with the web service so that the web service can select an appropriate notification window.

As another example, the web service 1042 can trigger a charging notification by sending an instruction over a wide-area network to the console 102. The console 102 can control a display to display a charging notification, as shown in FIG. 6, and/or can send an instruction over a local wireless connection to the video game controller 106 to illuminate a charging indicator as shown in FIG. 8A. In some cases, an auxiliary device can also illuminate a charging indicator as shown in FIG. 8B. The console can also illuminate its own charging indicator, as shown in FIG. 9.

In other implementations, the operating system 1010 on the console 102 implements the notification workflow 200. For instance, the console can receive application data from the web service 1042 on server 1040, user data from the mobile device 108, and battery data from the video game controller 106. The console can then make a determination as to when to trigger a notification as described previously.

In other cases, the companion application 1030 on mobile device 108 implements the notification workflow 200. For instance, the companion application can trigger the charging notification using local calendar data, user and/or application data received from the web service 1042, and battery data obtained from the video game controller 106 (e.g., via Bluetooth or other short-range wireless connection). In other cases, the mobile device employs a short-range wireless connection to the console to obtain user and/or application data instead of using a wide-area connection to the server 1040. Likewise, the mobile device can employ a short-range wireless connection to trigger other devices, such as the console 102 and/or the video game controller 106, to output the charging notification.

First Example Method

Figure 11:
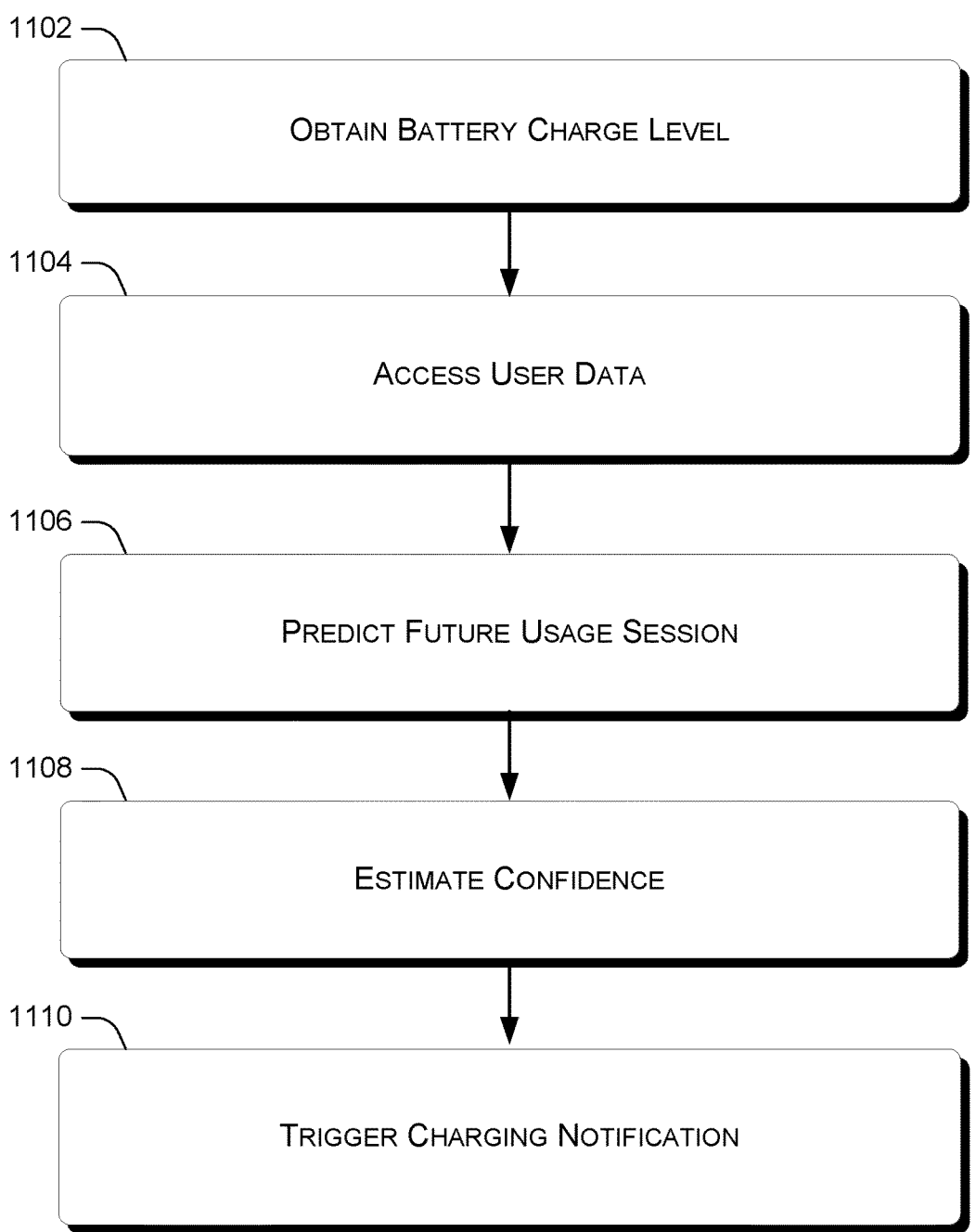
FIG. 11 illustrates a first example method or technique for triggering of a charging notification, consistent with some implementations of the disclosed techniques.

FIG. 11 illustrates an example method 1100, consistent with some implementations of the present concepts. Method 1100 can be implemented on many different types of devices, e.g., by one or more cloud servers, by a client device such as a laptop, tablet, or smartphone, or by combinations of one or more servers, client devices, etc.

Method 1100 begins at block 1102, where a battery charge level is obtained. As noted previously, the battery charge level can correspond to a current voltage of a battery of a battery-powered user device.

Method 1100 continues at block 1104, where user data is accessed. For instance, the user data can convey previous usage sessions by a user of the battery-powered user device as well as applications that were employed during those usage sessions. The user data can also convey information such as the user's travel habits, work habits, calendar events, etc.

Method 1100 continues at block 1106, where a future usage session is predicted. For instance, the beginning time, duration, and/or application that will likely be used during the future usage session can be predicted. In some cases, the future usage session prediction can convey information such as whether the application is likely to use features such as haptic or chat that tend to increase the amount of power drawn by the battery.

Method 1100 continues at block 1108, where a confidence that the battery will last through the future usage session is estimated. As noted previously, the confidence can be a Boolean value indicating whether the remaining battery time exceeds the predicted duration of the future usage session, or a score from a range of values that can be compared to a threshold. In some cases, the confidence value can be expressed inversely, e.g., as a risk that the battery will expire during the future usage session.

Method 1100 continues at block 1110, where a charging notification is triggered. For instance, the charging notification can be triggered when a Boolean confidence value is zero, or a confidence score falls below a threshold. The charging notification can be triggered for local output or an instruction can be sent over a network to instruct another device to output the charging notification.

Second Example Method

Figure 12:
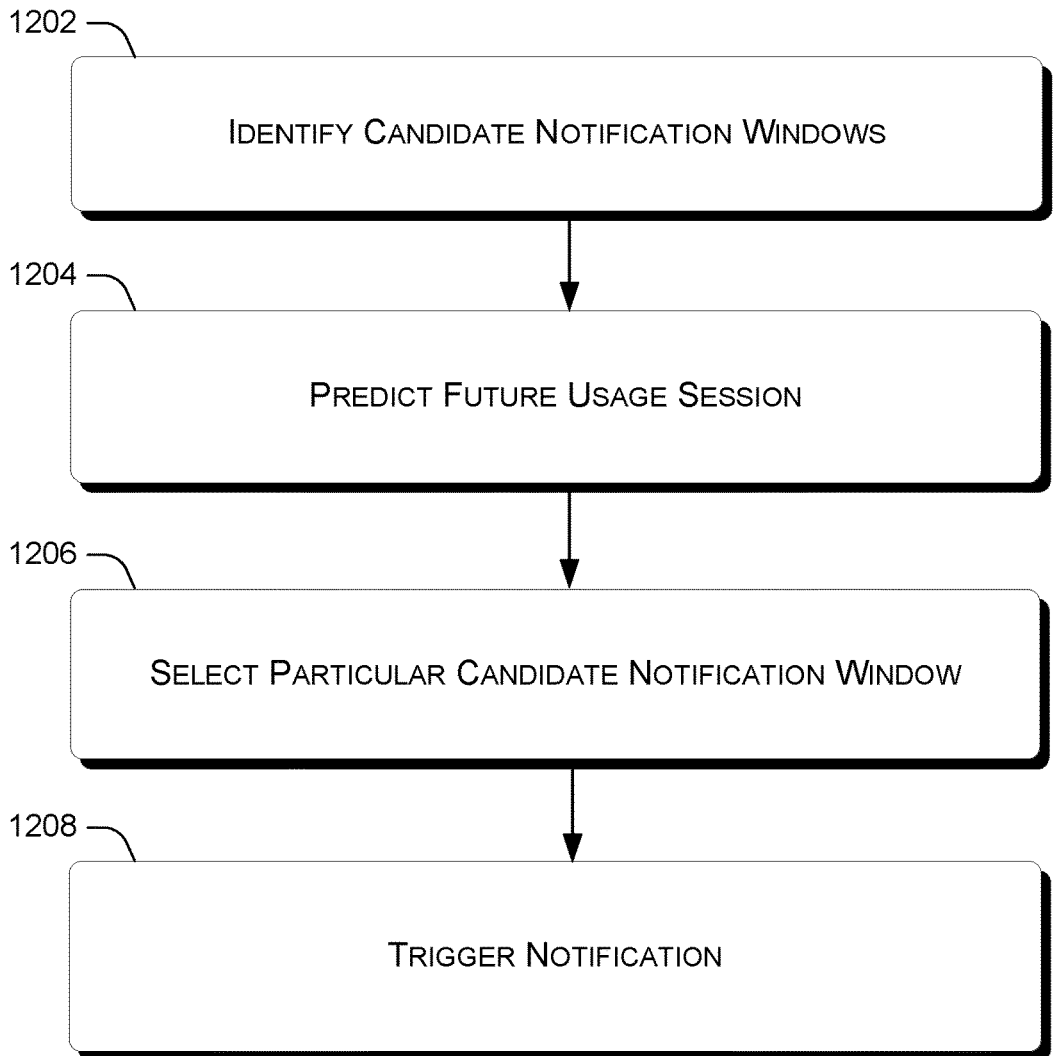
FIG. 12 illustrates a second example method or technique for triggering of a charging notification, consistent with some implementations of the disclosed techniques.

FIG. 12 illustrates an example method 1200, consistent with some implementations of the present concepts. Method 1200 can be implemented on many different types of devices, e.g., by one or more cloud servers, by a client device such as a laptop, tablet, or smartphone, or by combinations of one or more servers, client devices, etc.

Method 1200 begins at block 1202, where candidate notification windows are identified. For instance, user data can be accessed, where the user data reflects user travel habits of a user, work habits of the user, a calendar of the user, or previous interactions by the user with applications or media content. The candidate notification windows can be identified based on user availability, location of the user, location where the battery-powered user device is typically recharged, etc.

Method 1200 continues at block 1204, where a future usage session is predicted. For instance, the beginning time, duration, and/or application that will likely be used during the future usage session can be predicted. In some cases, the future usage session prediction can convey information such as whether the application is likely to use features such as haptic or chat that tend to increase the amount of power drawn by the battery.

Method 1200 continues at block 1206, where a particular notification window is selected from the candidate notification windows. For instance, the particular notification window can be selected based on user preferences, an amount of time needed to recharge the battery-powered user device, the duration of the predicted future usage session, etc.

Method 1200 continues at block 1208, where a charging notification is triggered during the particular notification window. The charging notification can be triggered for local output or an instruction can be sent over a network to instruct another device to output the charging notification.

Technical Effect

The disclosed implementations offer several technical improvements over conventional, static battery charging notifications. By considering user habits when employing a battery-powered user device, the disclosed techniques allow for charge notifications to occur in advance of predicted usage sessions while still allowing users to enjoy relatively long runtimes afforded by modern rechargeable batteries. As a consequence, different users with different tendencies can receive notifications at appropriate and convenient times, rather than being inconvenienced by a failure during use.

In addition, the disclosed techniques also can adjust the timing of charge notifications in view of different application characteristics. As noted, certain applications may tend to involve using a battery-powered user device in a manner that tends to draw more power than other applications. In addition, certain application characteristics can also be used to inform the timing of charging notifications, such as when applications are released, become playable after being downloaded in advance, or become available for download.

Furthermore, the disclosed techniques also consider battery characteristics, such as the time to recharge a given type of battery. As a consequence, battery charging notifications can be scheduled to give users adequate time to recharge their batteries prior to a given future usage session.

Still further, the disclosed implementations allow for charging notifications to be provided on a wide range of devices. LED-based charging indicators can be provided on battery-powered user devices as well as related devices such as consoles and/or auxiliary devices. Graphical or audible charging indicators can be provided on mobile devices or by displays/speakers controlled by another computing device, such as a console, laptop, etc. As a consequence, users can be reminded to charge batteries on a range of devices that may be in different locations and may be used very differently by a user, thus reducing the likelihood that the user does not charge their device in time for a future usage session.

Further Applications

The concepts introduced above were described with respect to a video gaming scenario involving a specific type of battery-powered user device, i.e., a video game controller. However, charging notifications for a wide range of other rechargeable devices can be provided as described herein. In certain cases, the type of data that can be employed to schedule charging notifications may vary depending on the type of device being recharged.

For instance, consider a drone aircraft flown by a user. Since drone aircraft are often flown outside, some implementations may consider weather forecasts when scheduling charging notifications. For instance, if a snowstorm is predicted on a given day, the disclosed techniques might delay a charging notification until after the snowstorm has finished since the user may be unlikely to fly the drone during a snowstorm. As another example, if a drone tends to use more power when flown on a windy day, this can be accounted for by scheduling charging notifications sooner than might be the case for days with less wind.

As another example, consider an electric car. A particular user may typically be able to commute back and forth to work for a week or two on a single charge, and thus it may be appropriate to output a charging notification at approximately 20% remaining battery power. However, if that user has a scheduled vacation to a location that is six hours drive time from their home, the disclosed techniques could schedule a charging notification sooner (e.g., at 50% remaining battery power) to ensure that the car is adequately charged prior to the trip. As another example, if a user typically takes a road trip on the first Sunday of every month to visit family, the disclosed techniques could learn this habit and schedule a charging notification on the first Saturday of every month.

As another example, consider a virtual or augmented reality headset with a visual display that can show virtual or augmented reality content to a user wearing the headset. Such a headset might provide a depth camera that uses a structured light technique to sense the distance of the user from physical objects. The use of the structured light camera could influence how quickly the battery on the headset is drained. Thus, some implementations could consider which virtual or augmented reality application a user is predicted to use, and/or a tendency of that user to use the depth camera, to determine when to trigger a charging notification. In addition, some use cases for such a headset might involve the user being outdoors, in which case factors such as predicted outdoor temperature can influence how long the battery is expected to last given the current charge level. Weather could also influence how long the usage session is expected to last, e.g., a user wearing a headset outdoors might be predicted to have shorter usage sessions in inclement weather.

In addition, some implementations may also provide charging notifications for removable batteries. For instance, rechargeable AA batteries can have different chemistry and different expected runtimes at the same voltage. Thus, some implementations may determine what type of removeable battery a given device has, e.g., either based on user input or using a local circuit within the battery-powered user device that can automatically detect the type of battery being employed.

The concepts disclosed herein can also be extended to use cases involving disposable batteries. For instance, consider a scenario where a user employs AA alkaline batteries in a video game controller. Disposable batteries can be replaced immediately, and thus the use of disposable batteries alleviates the need to recharge batteries prior to a usage session. Thus, in cases where a user employs disposable batteries, a notification can be provided immediately prior to a predicted usage session, e.g., if the battery-powered device is not expected to last through the next predicted usage session.

Definitions

The term "model" is used generally herein to refer to a range of processing techniques, and includes models trained using machine learning as well as hand-coded (e.g., heuristic-based) models. For instance, a machine-learning model could be a neural network, a support vector machine, a decision tree, etc. A heuristic-based model could be a hard-coded set of rules, a scoring scheme with manually-crafted weights, etc.

The term "battery-powered user device" refers to any device, powered by a battery, that can be used by a user to accomplish a task. A "peripheral device" refers to any device that can be employed to provide input to or output from a computer in a wired or wireless manner, e.g., a video game controller, printer, mouse, display, HMD, etc. A "usage session" is an instance where a user employs a battery-powered user device to accomplish such a task. A "battery management notification" is any kind of output by a machine that is understood or intended to remind the user to take steps to ensure that a battery-powered user device will last through a future usage session. One type of battery management notification is a "charging notification," which is understood or intended to remind a user to recharge a battery for a battery-powered user device.

The term "user data" refers to any data that describes characteristics of a user, such as a user's location, a user profile, user calendar, user interactions with computing devices or applications, etc. The term "application data" describes characteristics of an application, e.g., times when the application is available, features that the application supports, application genres, titles, etc. The term "battery data" refers to any data that describes characteristics of a battery, such as current charge state, discharge or recharge rates, battery chemistry, etc.

Machine Learning Overview

There are various types of machine learning frameworks that can be trained to perform a given task, such as predicting a usage session, determining a notification window, estimating confidence that a battery will last through a usage session, etc. Support vector machines, decision trees, and neural networks are just a few examples of machine learning frameworks that have been used in a wide variety of applications, such as image processing and natural language processing. Some machine learning frameworks, such as neural networks, use layers of nodes that perform specific operations.

In a neural network, nodes are connected to one another via one or more edges. A neural network can include an input layer, an output layer, and one or more intermediate layers. Individual nodes can process their respective inputs according to a predefined function, and provide an output to a subsequent layer, or, in some cases, a previous layer. The inputs to a given node can be multiplied by a corresponding weight value for an edge between the input and the node. In addition, nodes can have individual bias values that are also used to produce outputs. Various training procedures can be applied to learn the edge weights and/or bias values. The term "internal parameters" is used herein to refer to learnable values such as edge weights and bias values that can be learned by training a machine learning model, such as a neural network. The term "hyperparameters" is used herein to refer to characteristics of model training, such as learning rate, batch size, number of training epochs, number of hidden layers, activation functions, etc.

A neural network structure can have different layers that perform different specific functions. For example, one or more layers of nodes can collectively perform a specific operation, such as pooling, encoding, or convolution operations. For the purposes of this document, the term "layer" refers to a group of nodes that share inputs and outputs, e.g., to or from external sources or other layers in the network. The term "operation" refers to a function that can be performed by one or more layers of nodes. The term "model structure" refers to an overall architecture of a layered model, including the number of layers, the connectivity of the layers, and the type of operations performed by individual layers. The term "neural network structure" refers to the model structure of a neural network. The term "trained model" and/or "tuned model" refers to a model structure together with internal parameters for the model structure that have been trained or tuned. Note that two trained models can share the same model structure and yet have different values for the internal parameters, e.g., if the two models are trained on different training data or if there are underlying stochastic processes in the training process.

In some cases, a machine learning model can be trained using training data for a range of users, applications, and/or battery or device types. Such a model can be subsequently tuned to specific users, applications, battery types, or device types using additional training data for those specific users, applications, battery types, or device types.

Device Implementations

As noted above with respect to FIG. 10, system 1000 includes several devices, including a console 102, a video game controller 106, a mobile device 108, and a server 1040. As also noted, not all device implementations can be illustrated, and other device implementations should be apparent to the skilled artisan from the description above and below.

The term "device", "computer," "computing device," "client device," and or "server device" as used herein can mean any type of device that has some amount of hardware processing capability and/or hardware storage/memory capability. Processing capability can be provided by one or more hardware processors (e.g., hardware processing units/cores) that can execute computer-readable instructions to provide functionality. Computer-readable instructions and/or data can be stored on storage, such as storage/memory and or the datastore. The term "system" as used herein can refer to a single device, multiple devices, etc.

Storage resources can be internal or external to the respective devices with which they are associated. The storage resources can include any one or more of volatile or non-volatile memory, hard drives, flash storage devices, and/or optical storage devices (e.g., CDs, DVDs, etc.), among others. As used herein, the term "computer-readable medium" can include signals. In contrast, the term "computer-readable storage medium" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general-purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), neural processing units (NPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FP-GAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that devices generally can have input and/or output functionality. For example, computing devices can have various input mechanisms such as keyboards, mice, touchpads, voice recognition, gesture recognition (e.g., using depth cameras such as stereoscopic or time-of-flight camera systems, infrared camera systems, RGB camera systems or using accelerometers/gyroscopes, facial recognition, etc.). Devices can also have various output mechanisms such as printers, monitors, etc.

Also note that the devices described herein can function in a stand-alone or cooperative manner to implement the described techniques. For example, the methods and functionality described herein can be performed on a single computing device and/or distributed across multiple computing devices that communicate over network(s) 1050. Without limitation, network(s) 1050 can include one or more local area networks (LANs), wide area networks (WANs), the Internet, and the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

Various examples are described above. Additional examples are described below. One example includes a method comprising obtaining a battery charge level of a battery of a battery-powered user device, accessing user data for a user of the battery-powered user device, the user data reflecting previous usage sessions of the user with the battery-powered user device, based on the user data, predicting a future usage session of the user with the battery-powered user device, based on the battery charge level and the predicted future usage session, estimating confidence that the battery will last through the future usage session, and based on the estimated confidence, triggering a charging notification prior to the future usage session.

Another example can include any of the above and/or below examples where the battery-powered user device comprises a battery-powered peripheral device configured to provide input to or receive output from a computing device.

Another example can include any of the above and/or below examples where the user data identifies one or more applications that executed on the computing device during the previous usage sessions.

Another example can include any of the above and/or below examples where the estimating the confidence that the battery will last is based on a predicted duration of the future usage session.

Another example can include any of the above and/or below examples where the estimating the confidence that the battery will last is based on a battery discharge rate when using a particular application that the user is predicted to use during the future usage session.

Another example can include any of the above and/or below examples where the method further comprises determining that the user has downloaded at least part of the particular application to the computing device and predicting that the particular application will be used during the future usage session based on the user having downloaded the at least part of the particular application.

Another example can include any of the above and/or below examples where the method further comprises predicting a time when the future usage session will start based on a predetermined time when a remainder of the particular application will be available for download.

Another example can include any of the above and/or below examples where the method further comprises predicting the battery discharge rate based on whether an auxiliary device that is also powered by the battery tends to be employed with the particular application.

Another example can include any of the above and/or below examples where the method further comprises predicting the battery discharge rate based on haptic output by the battery-powered peripheral device when used with the particular application.

Another example can include any of the above and/or below examples where the method further comprises, based on the user data, determining a selected notification window for outputting the charging notification and outputting the charging notification during the selected notification window.

Another example can include any of the above and/or below examples where the user data reflects travel habits of the user, work habits of the user, a calendar of the user, or previous interactions by the user with applications or media content.

Another example can include any of the above and/or below examples where the method further comprises determining an amount of time to recharge the battery to a particular charge level and determining the selected notification window based on the amount of time to charge the battery.

Another example can include any of the above and/or below examples where the particular charge level is a fully charged level or a charge level that is less than fully charged but sufficient to last for a predicted duration of the future usage session.

Another example can include any of the above and/or below examples where the charging notification is output directly on the battery-powered user device, on a computing device controlled by the battery-powered user device, or on a mobile device associated with the user.

Another example includes a system comprising a processor and a storage medium storing instructions which, when executed by the processor, cause the system to: obtain a battery charge level of a battery of a battery-powered user device, access user data reflecting previous usage by a user of the battery-powered user device, predict future usage by the user of the battery-powered user device, and based on the battery charge level and the predicted future usage, trigger a charging notification for the battery-powered user device.

Another example can include any of the above and/or below examples where the battery-powered user device comprises a video game controller that controls a video game console or a headset that outputs audio provided by the video game console.

Another example can include any of the above and/or below examples provided on a server remote from the video game console, where triggering the charging notification comprises sending an instruction from the server to the video game console to at least one of display the charging notification or cause the video game controller to display the charging notification.

Another example can include any of the above and/or below examples provided on a server remote from the video game console, where triggering the charging notification comprises sending an instruction from the server to a mobile device of the user to output the charging notification.

Another example includes a computer-readable storage medium storing instructions which, when executed by a computing device, cause the computing device to perform acts comprising, based on user data, identifying a plurality of candidate notification windows for outputting a charging notification to a user of a battery-powered user device: predicting a future usage session by the user of the battery-powered user device, based on the predicted future usage session, choosing a selected notification window from the plurality of candidate notification windows, and triggering the charging notification for the battery-powered user device to occur during the selected notification window.

Another example can include any of the above and/or below examples where the acts further comprise choosing the selected notification window from the plurality of candidate notification windows based on a beginning time and predicted duration of the future usage session.

The invention claimed is:

1. A method comprising:
obtaining a battery charge level of a battery of a battery-powered user device;
accessing user data for a user of the battery-powered user device, the user data reflecting haptic output by the battery-powered user device during previous usage sessions of the user with the battery-powered user device;
based on the user data, predicting a future usage session of the user with the battery-powered user device;
based on the battery charge level and the haptic output by the battery-powered user device during the previous usage sessions, estimating confidence that the battery will last through the future usage session; and
based on the estimated confidence, triggering a charging notification prior to the future usage session.

2. The method of claim 1, wherein the battery-powered user device comprises a battery-powered peripheral device configured to provide input to or receive output from a computing device.

3. The method of claim 2, wherein the user data identifies one or more applications that executed on the computing device during the previous usage sessions.

4. The method of claim 3, wherein the estimating the confidence that the battery will last is based on a predicted duration of the future usage session.

5. The method of claim 4, wherein the estimating the confidence that the battery will last is based on a battery discharge rate when using a particular application that the user is predicted to use during the future usage session.

6. The method of claim 5, further comprising:
determining that the user has downloaded at least part of the particular application to the computing device; and
predicting that the particular application will be used during the future usage session based on the user having downloaded the at least part of the particular application.

7. The method of claim 6, further comprising:
predicting a time when the future usage session will start based on a predetermined time when a remainder of the particular application will be available for download.

8. The method of claim 5, further comprising:
predicting the battery discharge rate based on whether an auxiliary device that is also powered by the battery tends to be employed with the particular application.

9. The method of claim 1, further comprising:
estimating the confidence that the battery will last through the future usage session based on a tendency of the user, during the previous usage sessions, to use the battery-powered user device in a manner that causes the battery-powered user device to generate haptic output.

10. The method of claim 1, further comprising:
based on the user data, determining a selected notification window for outputting the charging notification; and
outputting the charging notification during the selected notification window.

11. The method of claim 10, wherein the user data reflects travel habits of the user, work habits of the user, a calendar of the user, or previous interactions by the user with applications or media content.

12. The method of claim 10, further comprising:
determining an amount of time to recharge the battery to a particular charge level; and determining the selected notification window based on the amount of time to charge the battery.

13. The method of claim 12, wherein the particular charge level is a fully charged level or a charge level that is less than fully charged but sufficient to last for a predicted duration of the future usage session.

14. The method of claim 1, wherein the charging notification is output directly on the battery-powered user device, on a computing device controlled by the battery-powered user device, or on a mobile device associated with the user.

15. A system comprising:
a processor; and
a storage medium storing instructions which, when executed by the processor, cause the system to:
obtain a battery charge level of a battery of a battery-powered user device;
access user data reflecting haptic output by the battery-powered user device during previous usage by a user of the battery-powered user device;
predict future usage by the user of the battery-powered user device; and
based on the battery charge level and the haptic output by the battery-powered user device during the previous usage, trigger a charging notification for the battery-powered user device prior to the future usage.

16. The system of claim 15, wherein the battery-powered user device comprises a video game controller that controls a video game console or a headset that outputs audio provided by the video game console.

17. The system of claim 16, provided on a server remote from the video game console, wherein triggering the charging notification comprises sending an instruction from the server to the video game console to at least one of display the charging notification or cause the video game controller to display the charging notification.

18. The system of claim 16, provided on a server remote from the video game console, wherein triggering the charging notification comprises sending an instruction from the server to a mobile device of the user to output the charging notification.

19. A computer-readable storage medium storing instructions which, when executed by a computing device, cause the computing device to perform acts comprising:
based on user data, identifying a plurality of candidate notification windows for outputting a charging notification to a user of a battery-powered user device;
determining that the user has downloaded at least part of a particular application;
predicting that the particular application will be used during a predicted future usage session based on the user having downloaded the at least part of the particular application;
based on the predicted future usage session, choosing a selected notification window from the plurality of candidate notification windows; and
triggering the charging notification for the battery-powered user device to occur during the selected notification window.

20. The computer-readable storage medium of claim 19, the acts further comprising:
choosing the selected notification window from the plurality of candidate notification windows based on a beginning time and predicted duration of the future usage session.

* * * * *